United States Patent Office 3,407,152
Patented Oct. 22, 1968

3,407,152
FOAM PLASTICS AND PROCESS FOR MAKING THEM
Alfred Kuhlkamp, Hofheim, Taunus, Albrecht Moschel, Kelkheim, Taunus, and Rudolf Nowack, Frankfurt am Main, Germany, assignors to Farbwerke Hoechst Aktiengesellschaft vormals Meister Lucius & Bruning, Frankfurt am Main, Germany, a corporation of Germany
No Drawing. Filed Sept. 10, 1965, Ser. No. 486,542
Claims priority, application Germany, Sept. 17, 1964, F 43,997
9 Claims. (Cl. 260—2.5)

ABSTRACT OF THE DISCLOSURE

A process for the manufacture of a foam plastic which comprises reacting (a) a compound of the formula $$R-[O-\underset{\underset{O}{\|}}{C}-CH_2-X]_n$$

wherein R is a branched or unbranched polyether or polyester group, X is an acetyl or nitrile group and $n$ is an integer of at least 2, (b) formaldehyde, (c) piperazine carbamate and (d) from about 0.01% to about 20% of an ortho-ester of titanium or zirconium or an alcoholate of aluminum, and permitting the reaction mixture thereof to foam.

---

The present invention relates to foam plastics and a process for making them.

The present invention provides a process for the manufacture of foam plastics wherein compounds of the following formula $$R-\left[O-\underset{\underset{O}{\|}}{C}-CH_2-X\right]_n$$

in which R represents a branched or unbranched polyether or polyester, X stands for an acetyl or nitrile group and $n$ is a whole number of at least 2, are reacted with formaldehyde and a reaction product of a polyamine and carbon dioxide in the presence of 0.01 to 20% by weight of an ortho-ester of titanium or zirconium or an alcoholate of aluminum.

Suitable additives are, for example, titanium-o-n-butylate, zirconium-o-n-butylate and aluminum-isobutylate.

In the process of the invention, the polyether or polyester chains are probably preliminarily cross-linked in an unstable manner via the complex compounds of the enol or enimic form of the acetoacetic ester groups or cyanoacetic ester groups present in the reaction mixture, according to the following formulae

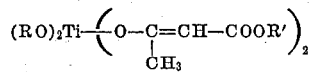

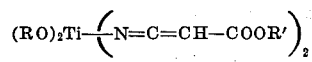

in which R stands for an alkyl group and R' for a polyether or polyester.

It is surprising that foam plastics having fine pores and a good elasticity can be obtained by admixing the reaction mixture with the above Ti-, Zr- or Al-compounds, which as such are decomposed under the conditions of a Mannich or Knoevenagel reaction.

The properties of the products of the invention may vary within wide limits depending on the amount of catalyst added. The amount of Ti-, Zr- or Al-compound to be added is within the range of 0.01 to 20%, advantageously 0.1 to 5%, depending on the viscosity of the mixture to be foamed.

As polyethers there may be used compounds which have been obtained by polymerization of ethylene oxide, propylene oxide or tetrahydrofurane either as such or in the presence of triols, such as glycerol or trimethylol propane, or tetrols such as pentaerythritol to produce branching.

As polyesters there may be used compounds which are obtained, for example, by known processes from polybasic acids, for example, adipic acid or phthalic acid, and polyhydric alcohols, for example, ethylene glycol, butylene glycol, glycerol, trimethylol propane or hexanetriol, or aliphatic ether diols, for example, diethylene glycol or dibutylene glycol, or mixed aliphatic-aromatic or aliphatic-cycloaliphatic ether diols, for example, 2,2-bis-[4-β-hydroxyethoxyphenyl] - propane or 2,2 - bis - [4-β-hydroxyethoxycyclohexyl]-propane.

The acetoacetic acid group is introduced into the polyethers or polyesters containing free hydroxyl groups by reacting the said polyethers or polyesters in known manner with diketene.

The cyanoacetic acid group can be introduced by an ester-interchange which may be partial or complete calculated on the number of free hydroxyl groups. By subsequent acylation of a partially cyanoacetylated polyhydroxyl compound with diketene, a mixed cyanoacetic ester-acetoacetic ester can be obtained.

To obtain uniform foams of determined pore density, it is advantageous to add a small amount of a surface-active substance, for example, silicone oil.

Foaming is advantageously carried out as follows:

The compound having CH-acidic radicals is intimately mixed with the complex-forming substance and the surface-active substance. The optimum pH value is then adjusted by addition of acid. The whole is then mixed with the reaction product of polyamine and carbon dioxide and the resulting mixture is reacted with aldehyde.

In the condensation which sets in, carbon dioxide is liberated from the carbamate.

By the addition of the complex-forming substance which brings about a preliminary cross-linking, a sufficient viscosity is ensured also when the starting substances carrying CH-acidic radicals have only a low viscosity, and uniform foaming is obtained since the complex linkage is not dissolved until condensation sets in.

The following examples serve to illustrate the invention but they are not intended to limit it thereto, the parts being by weight.

EXAMPLE 1

2 parts of aluminum isobutylate were stirred into 40 parts of a polyester of adipic acid, diethylene glycol and glycerol, which had an OH-number of 137.5 and whose OH-groups had been acetoacetylated. The reaction mixture so obtained was thoroughly mixed with 0.8 part of silicone oil having a viscosity of 5,000 centipoises, 1.2 parts of acetic acid and 8.23 parts of piperazine carbamate and then rapidly made into a creamy paste with 7.59 parts of a 50% solution of formaldehyde in methanol.

The mixture so obtained was poured into a foaming vessel. After a few minutes, a uniform foam having fine pores and a density of 0.11 was obtained.

EXAMPLE 2

1 part of aluminum isobutylate was stirred into 40 parts of a polyester of adipic acid, diethylene glycol and trimethylol propane which had an OH-number of 136.5 and whose OH-groups had been acetoacetylated. The reaction mixture was thoroughly mixed with 0.8 part of silicone oil having a viscosity of 10,000 centipoises, 1.2 parts of acetic acid and 8.24 parts of piperazine carbamate and then rapidly made into a creamy paste with 7.60 parts of a 50% solution of formaldehyde in methanol. Foaming occurred shortly after the mixture had been poured into the foaming vessel.

A foam plastic having a uniform structure with fine pores and a density of 0.08 was obtained.

EXAMPLE 3

1 part of titanium-o-n-butylate was stirred into 50 parts of a polyester of adipic acid, diethylene glycol and trimethylol propane which had an OH-number of 120 and whose OH-groups had been cyanoacetylated. The reaction mixture was thoroughly mixed with 1 part of silicone oil having a viscosity of 10,000 centipoises, 1.5 parts of acetic acid and 9.05 parts of piperazine carbamate and then rapidly made into a creamy paste with 8.35 parts of a 50% solution of formaldehyde in methanol and poured into a foaming vessel.

A foam having fine pores and a density of 0.07 was obtained.

EXAMPLE 4

The process was carried out as described in Example 3 but while using, instead of 50 parts of the said cyanoacetylated polyester, a mixture of 25 parts of the cyanoacetylated polyester and 25 parts of a polyester of adipic acid, diethylene glycol and trimethylol propane which had an OH-number of 112.5 and whose OH-groups had been acetoacetylated.

A soft foam having fine pores, a very good elasticity and a density of 0.08 was obtained.

EXAMPLE 5

200 parts of a polyester of adipic acid, diethylene glycol and trimethylol propane which had an OH-number of 178.5 and whose OH-groups had been acetoacetylated and cyanoacetylated in a ratio of 1:4, 4 parts of aluminum isobutylate, 4 parts of silicone oil having a viscosity of 10,000 centipoises, 7.5 parts of acetic acid and 53.25 parts of piperazine carbamate were thoroughly mixed.

The reaction mixture was rapidly stirred with 47.20 parts of a 50% solution of formaldehyde in methanol to obtain a creamy paste.

A foam having fine pores, a good elasticity and a density of 0.05 was obtained.

EXAMPLE 6

1 part of titanium-o-n-butylate was stirred into 40 parts of a polyester of adipic acid, diethylene glycol, 2,2-bis-[4-β-hydroxy-ethoxy-phenyl]-propane and trimethylol propane, which had an OH-number of 136.5 and whose OH-groups had been acetoacetylated. The reaction mixture so obtained was thoroughly mixed with 0.8 part of silicone oil having a viscosity of 5,000 centipoises, 1.2 parts of acetic acid and 8.25 parts of piperazine carbamate and then rapidly stirred with 7.62 parts of a 50% solution of formaldehyde in methanol to obtain a creamy paste.

After foaming, a foam plastic having a uniform structure with fine pores, a very good elasticity and a density of 0.10 was obtained.

EXAMPLE 7

1 part of titanium-o-n-butylate was stirred into 40 parts of a branched polyether having an OH-number of 63 and whose OH-groups had been acetoacetylated. The reaction mixture so obtained was thoroughly mixed with 0.8 part of silicone oil having a viscosity of 5,000 centipoises, 1.2 parts of acetic acid and 3.08 parts of piperazine carbamate and then rapidly stirred with 2.84 parts of a 50% solution of formaldehyde in methanol to obtain a creamy paste.

After pouring the mixture into a foaming vessel, a foam having fine pores, a good elasticity and a density of 0.16 was obtained.

EXAMPLE 8

40 parts of a branched polyester of adipic acid, phthalic acid, diethylene glycol and trimethylol propane, which had an OH-number of 117.5 and whose OH-groups had been acetoacetylated, 1 part of zirconium-o-n-butylate, 0.8 part of silicone oil having a viscosity of 5,000 centipoises, 1.2 parts of acetic acid and 7.10 parts of piperazine carbamate were mixed and rapidly stirred with 6.55 parts of a 50% solution of formaldehyde in methanol to obtain a creamy paste.

After pouring into a foaming mold, a foam plastic having fine pores, a high elasticity and a density of 0.08 was obtained.

We claim:

1. A process for the manufacture of a foam plastic which comprises reacting (a) a compound of the formula

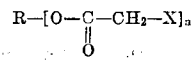

wherein R is a branched or unbranched polyether or polyester group, X is an acetyl or nitrile group and $n$ is an integer of at least 2, (b) formaldehyde, (c) piperazine carbamate and (d) from about 0.01% to about 20% of an ortho-ester of titanium or zirconium or an alcoholate of aluminum, and permitting the reaction mixture thereof to foam.

2. A process according to claim 1 wherein R is a polyester having free hydroxyl groups that are acetoacetylated or cyanoacetylated.

3. A process according to claim 1 wherein R is a polyether having free hydroxyl groups that are acetoacetylated or cyanoacetylated.

4. A process according to claim 1 wherein said (d) is titanium-ortho-n-butylate.

5. A process according to claim 1 wherein said (d) is zirconium-ortho-n-butylate.

6. A process according to claim 1 wherein said (d) is aluminum isobutylate.

7. A process according to claim 1 wherein the amount of said (d) is about 0.1% to about 5%.

8. A process according to claim 1 wherein said (a) and (d) are reacted and the reaction mixture thereof is then reacted with said (b) and (c).

9. A process according to claim 8 wherein said reaction mixture is blended first with said (c) and then with said (b).

References Cited

UNITED STATES PATENTS

| | | | |
|---|---|---|---|
| 2,326,006 | 8/1943 | Bruson | 260—64 |
| 2,390,153 | 12/1945 | Kern | 260—72 |
| 2,475,273 | 7/1949 | Adelson et al. | 260—63 |
| 2,755,268 | 7/1956 | Uelzmann | 260—64 |
| 3,236,913 | 2/1966 | Pfeiffer et al. | 260—851 |
| 3,275,587 | 9/1966 | Weller et al. | 260—29.2 |
| 3,311,575 | 3/1967 | Graham | 260—2.5 |

MURRAY TILLMAN, *Primary Examiner.*

JOHN C. BLEUTGE, *Assistant Examiner.*